US00RE36728E

United States Patent [19]

Ishii

[11] E Patent Number: Re. 36,728

[45] Reissued Date of Patent: Jun. 13, 2000

[54] SYSTEM AND METHOD FOR DRYING GREEN WOODS

[76] Inventor: Sachio Ishii, 20-11, Shimokawamachi, Maebashi-shi, Gunma 379-21, Japan

[21] Appl. No.: 08/614,571

[22] Filed: Mar. 13, 1996

Related U.S. Patent Documents

Reissue of:

[64] Patent No.: 5,293,700
Issued: Mar. 15, 1994
Appl. No.: 07/773,817
Filed: Oct. 9, 1991

[30] Foreign Application Priority Data

Dec. 10, 1990 [JP] Japan ..... 2-272187

[51] Int. Cl.[7] ..... F26B 7/00

[52] U.S. Cl. ..... 34/396; 34/417; 34/479; 34/225; 34/233; 34/196

[58] Field of Search ..... 34/378, 396, 417, 34/443, 478, 479, 497, 518, 539, 548, 196, 212, 219, 225, 233; 110/203, 204, 224, 348; 432/136, 187

[56] References Cited

U.S. PATENT DOCUMENTS

| | | | |
|---|---|---|---|
| 1,413,018 | 4/1922 | Fujino | 34/396 X |
| 1,961,143 | 6/1934 | Gehnrich | 34/224 |
| 2,358,423 | 9/1944 | Stone | 432/187 X |
| 2,553,452 | 5/1951 | Guthrie | 34/548 X |
| 2,725,224 | 11/1955 | Pierce | 263/40 |
| 2,884,707 | 5/1959 | Sandback | 34/36 |
| 3,675,600 | 7/1972 | Jones | 110/8 R |
| 4,099,338 | 7/1978 | Mullin et al. | 34/35 |
| 4,233,914 | 11/1980 | Schuette et al. | 110/233 |
| 4,312,320 | 1/1982 | Jennings | 110/224 |
| 4,344,237 | 8/1982 | Willington | 34/225 |
| 4,384,850 | 5/1983 | Dixon | 432/187 X |
| 4,391,205 | 7/1983 | Morey | 110/204 |
| 4,888,884 | 12/1989 | Bartling et al. | 34/479 |

FOREIGN PATENT DOCUMENTS

| | | | |
|---|---|---|---|
| 480445 | 4/1992 | European Pat. Off. | F26B 21/04 |
| 544959 | 10/1922 | France . | |
| 103850 | 10/1897 | Germany . | |
| 59-129373 | 7/1984 | Japan . | |
| 60-103281 | 6/1985 | Japan . | |

OTHER PUBLICATIONS

N.V. Krechetov, *Drying of Wood by Flue Gases,* M. "Goslesobumizdat," 1961, pp. 185–186, Fig. 68.
USSR Inventor's Certificate Specification No. 928153.
I.S. Selugin, *Drying of Wood.*

*Primary Examiner*—Henry Bennett
*Assistant Examiner*—Steve Gravini
*Attorney, Agent, or Firm*—McDermott, Will & Emery

[57] ABSTRACT

A system for drying a large quantity of wood efficiently, which includes: a wood drying room capable of being sealed; a combustion-gas generator provided with an air-inlet conduit for introducing fresh air for combustion use into a combustion chamber provided in a lower area of the combustion-gas generator; a combustion-gas supplying passage extending from an upper area of the combustion-gas generator to an upper area of the wood drying room; an exhaust-gas discharging conduit extending from a bottom area of the wood drying room to a chimney; a combustion-gas recovery conduit extending from the bottom area of the wood drying room to the combustion-gas generator, and a gas flow-rate control unit provided in at least one of the exhaust-gas discharging conduit and the combustion-gas recovery conduit.

12 Claims, 1 Drawing Sheet

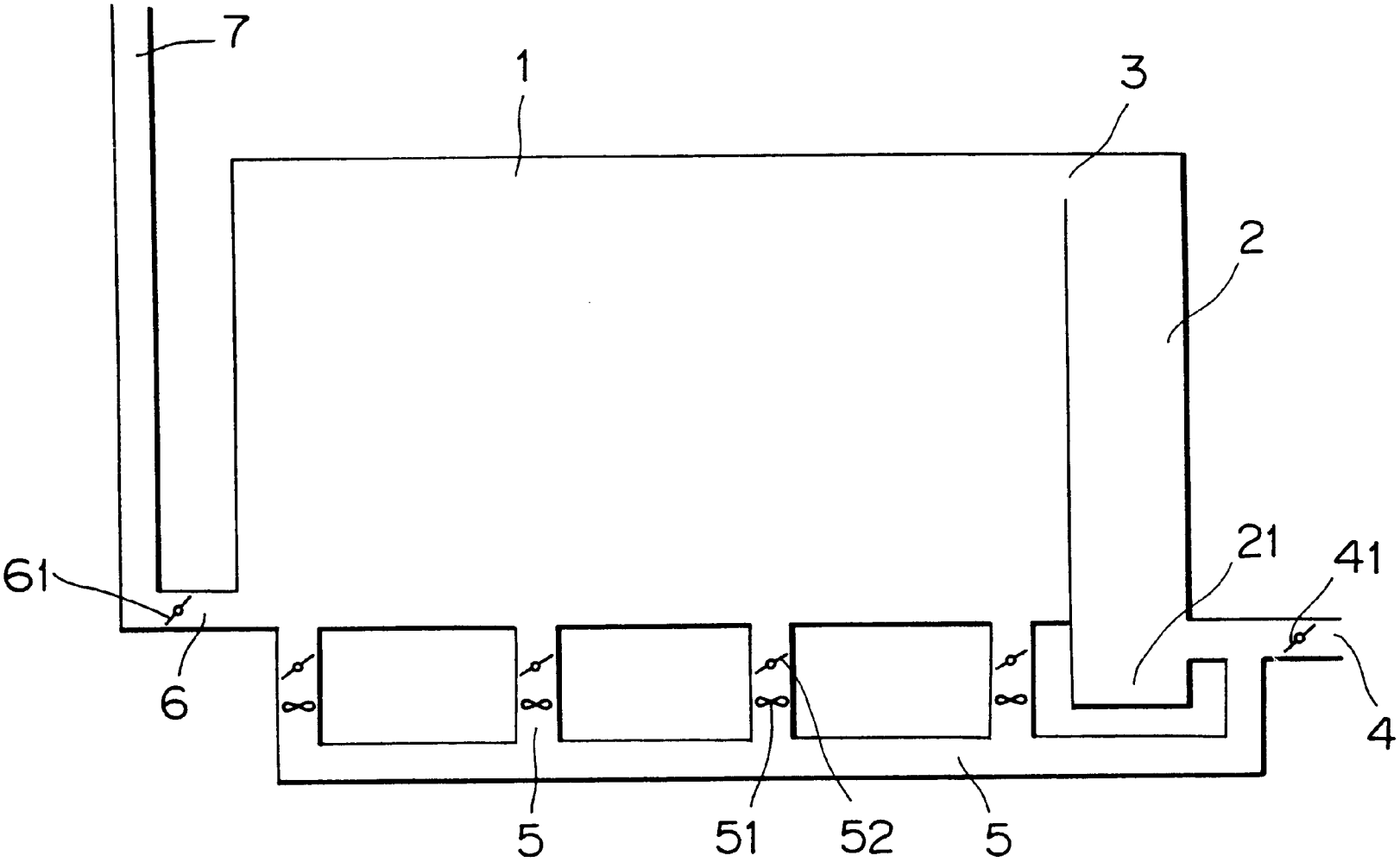
1
2
3
4
41
21
5
52
51
5
6
61
7

SYSTEM AND METHOD FOR DRYING GREEN WOODS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a system for drying wood, and more particularly to a thermal dry stem for drying green wood, green bamboo and other green plants (which have been harvested) to produce, in short periods of time, dried wood, dried bamboo and other dried plants which have been stabilized in their water content.

2. Description of the Prior Art

After harvest, green wood (and the like) are rich in water content, and usually carry many insects and their eggs. Consequently, in producing lumbers for building use and/or furniture use, it is usual to dry the green wood and chemically treat the same to kill the insects and their eggs.

In drying process, the green wood is hitherto subjected to natural seasoning in which it is necessary to leave the green wood as it is for a long period of time, for example, three to five years in a wood yard. During this long period of time, it is necessary for workers of the wood yard to frequently move the wood to enhance the drying process thereof. However, leaving the wood for such long period of time in the wood yard results in a poor investment, and is further disadvantageous in preventing the woods from being attached by insect.

Under such circumstances, hitherto, various quick drying processes for drying wood in short periods of time have been proposed. For example, one of these conventional drying processes is of a vacuum drying type. Another of these conventional drying processes is of a thermal heating type using a drying room to which hot air is supplied.

However, dried wood produced by conventional quick drying processes suffer disadvantages in that the wood is not prevented from cracking; and absorbing moisture which causes distortion of the woods, as in the case of dried wood produced by natural seasoning.

In order to solve the above problems inherent in conventional quick drying processes, another conventional process (i.e., a conventional thermal heating type process) has been proposed. In the conventional thermal heating type process, green wood is first housed in a drying room in which a hot combustion gas produced by burning waste wood and the like is introduced so that the green wood is brought into contact with the hot combustion gas so as to be dried and disinfected with heat and various smoke elements of the combustion gas to kill insects and their eggs in the woods, without being subjected to any chemical treatment, and without causing any distortion of the dried wood.

For example, Japanese Patent Laid-Open Nos. Sho 59-129373 and 60-103281 disclose a conventional thermal heating type process in which green wood is housed in a treatment chamber which has: its upper area subjected to a hot blast; and its lower area subjected to a cool blast, so as to dry the wood. These Japanese Patent Laid-Open documents also disclose a system for carrying out a process which is; however, poor in treatment efficiency of the woods. In this process, when large quantity of green wood is housed in the treatment chamber in order to improve the treatment efficiency, the dried wood obtained through the process tend to vary in water content, which makes it impossible to stabilize the products (or dried wood) in quality.

SUMMARY OF THE INVENTION

In view of the above problems inherent in conventional drying processes and systems, the present invention was made.

Consequently, it is an object of the present invention to solve the above problems by providing:

An apparatus for drying a large quantity of wood which comprises:

a wood drying room having a generally unrestricted open interior space therein and capable of being sealed;

a combustion-gas generator provided with an air-inlet conduit for introducing fresh air for combustion use into a combustion chamber provided in a lower area of the combustion-gas generator;

a combustion-gas supplying passage extending from an upper area of the combustion-gas generator to an opening in the wood drying room which opening is located at an upper portion of the wood drying room at one side thereof;

an exhaust-gas discharging conduit extending to a chimney from a bottom area of the wood drying room;

said chimney being located on a side of said wood drying room which is opposite said side at which said opening is located;

a combustion-gas recovery conduit extending from the bottom area of the wood drying room to the combustion-gas generator; and a gas flow-rate control unit provided in at least one of the exhaust-gas discharging conduit or the combustion-gas recovery conduit.

In the system of the present invention for drying the wood, the combustion-gas recovery conduit may be directly connected with the combustion-gas generator.

In the system of the present invention, it is also possible to connect the combustion-gas recovery conduit with the air-inlet conduit.

Further, in the system of the present invention, the gas flow-rate control unit (which is provided in at least one of the exhaust-gas discharging conduit or the combustion-gas recovery conduit) is preferably constructed of, in combination, a fan and a damper. In addition, it is also possible that the gas flow-rate control unit is constructed of only one of the fan or the damper.

Furthermore, it is also preferable to provide a fan and/or a damper in the air-inlet conduit of the system of the present invention. However, the provision of the air-inlet conduit is not indispensable to the system of the present invention.

In the system of the present invention, however, it is preferable to provide a fan in at least one of the air-inlet conduit, exhaust-gas discharging conduit, or the combustion-gas recovery conduit.

In operation of the system of the present invention having the above construction for drying the green wood and the like, waste wood and the like are burned in the combustion-gas generator of the system to produce a hot combustion gas accompanied with smoke. Then, the hot combustion gas is introduced into an upper area of the wood drying room through the combustion-gas supplying passage.

In the wood drying room, the hot combustion gas passes through the green wood (which is piled up in the room)

downward to heat and dry the same, and reaches a bottom area of the room, from which bottom area the combustion gas flows into the exhaust-gas discharging conduit and is discharged to the atmosphere through the chimney of the system.

In the above operation of the system of the present invention, a part of the combustion gas flowing out of the bottom area of the wood drying room is circulated so as to enter the combustion-gas recovery conduit through which the thus circulated part of the combustion gas is returned to the combustion-gas generator in which the thus circulated part of the combustion gas is used to control a combustion speed of the fuel (i.e., waste woods) in the generator in cooperation with a fresh air introduced into the generator through the air-inlet conduit.

In an efficient drying operation of the green woods in the wood drying system of the present invention, it is necessary for the system to produce a combustion gas with substantially no oxygen content. In addition, it is not desirable for a temperature of the combustion gas to excessively increase. Therefore, the circulation of the combustion gas in part is desirable in the system of the present invention. By circulating a part of the combustion gas through the system of the present invention, it is possible for the system to recover vapor and volatile materials from the combustion gas before the gas is discharged from the system through the chimney. The thus recovered volatile materials are subjected to combustion again and burned in the system before they are discharged to the atmosphere through the chimney, which combustion contributes towards the solution of air pollution (caused by the volatile materials contained in the combustion gas) and also contributes to cost saving since the volatile materials may be utilized as fuels in the system of the present invention.

BRIEF DESCRIPTION OF THE DRAWING

The drawing shows a longitudinal sectional view of the wood drying system of the present invention, illustrating the construction of the system.

DESCRIPTION OF THE PREFERRED EMBODIMENTS

Hereinbelow, the present invention will be described in detail with reference to the accompanying drawing.

As shown in the drawing, in drying operation a of green wood (and the like), the wood is housed and piled up in a wood drying room 1. The room 1 is capable of being sealed, while so disposed as to be adjacent to a combustion-gas generator 2 an upper area of which is in communication with an upper area of the wood drying room 1 by means of a combustion-gas supplying passage 3.

A lower area of the combustion-gas generator 2 forms a combustion chamber 21 in which suitable fuels such as waste wood and the like are burned to produce a hot combustion gas. With the combustion chamber 21 of the combustion-gas generator 2 is connected an air-inlet conduit 4 for introducing fresh air into the combustion chamber 21.

Rotatably mounted in an opening-end portion of the air-inlet conduit 4 is a damper 41 for controlling the flow rate of fresh air introduced into the combustion chamber 21 of the combustion-gas generator 2.

At a plurality of bottom or floor positions of the wood drying room 1, the room 1 is connected with a plurality of combustion-gas recovery conduits 5 to air-inlet conduit 4.

Mounted in each of the combustion-gas recovery conduits 5 are: a fan 51 for sucking the combustion gas from the wood drying room 1 to supply the same gas to the combustion-gas generator 2; and a damper 52 for controlling the flow rate of the thus sucked combustion gas from the wood drying room 1.

On the other band, an exhaust-gas discharging conduit 6 is connected with a corner portion of the wood drying room 1 so as to be oppositely disposed from the combustion-gas supplying passage 3 in a diagonal direction of the wood drying room 1, whereby an inlet portion of the exhaust-gas discharging conduit 6 is positioned at the remotest point of the wood drying room 1 with respect to the combustion-gas supplying passage 3. The exhaust-gas discharging conduit 6 extends to a chimney 7 from which an exhaust gas passing through the conduit 6 is discharged into the atmosphere.

In the exhaust-gas discharging conduit is rotatably mounted a damper 61 for controlling a flow rate of the exhaust gas to be discharged into the chimney 7.

In operation of the wood drying system of the present invention having the above construction, first, a suitable carrier such as a bogie carries green wood to the wood drying room 1 in which the green wood is piled up on the floor of the room 1. After that, the room 1 is closed so as to be hermetically sealed, and then a suitable fuel such as waste wood and the like is burned in the combustion chamber 21 of the combustion-gas generator 2 to produce a hot combustion gas which flows out of the generator 2 into the wood drying room 1 through the combustion-gas supplying passage 3.

At this time, when the damper 61 of the exhaust-gas discharging conduit 6 is closed, the hot combustion gas gradually fills the wood drying room 1 and replaces air previously confined in the room 1, which air is sucked into the combustion chamber 21 of the combustion-gas generator 2 through the combustion-gas recovery conduits 5. Until the room 1 is filled with the combustion gas, the thus produced hot combustion gas is circulated through the system.

As the temperature of the wood drying room 1 increases with the heat of the hot combustion gas, the oxygen content of the atmosphere in the room 1 decreases to lower the combustion speed of the fuel in the combustion chamber 21 of the combustion-gas generator 2, so that the rate of temperature increases of the wood drying room 1 is lowered.

Under such circumstances, the damper 61 of the exhaust-gas discharging conduit 6 is slightly opened to permit a part of the combustion gas (which is confined in the wood drying room 1) to escape to the chimney 7 through the exhaust-gas discharging conduit 6. As a result, fresh air is introduced into the combustion chamber 21 of the combustion-gas generator 2 through the air-inlet conduit 4, the amount of which fresh air corresponds to that of the part of the combustion gas permitted to escape from the wood drying room 1. By controlling the amount of the fresh air introduced into the combustion chamber 21 of the combustion-gas generator 2, the combustion speed of the fuel in the chamber 21 is adequately controlled.

In addition, in operation, by operating both of the fans 51 and the dampers 52 of the combustion-gas recovery conduits 5, a part of the combustion gas confined in the wood drying room 1 is forcibly circulated through the system so as to be supplied to the combustion chamber 21 of the combustion-gas generator 2, so that the fresh air supplied to the combustion chamber 21 is diluted with the thus circulated part of the combustion gas to make it possible to keep the oxygen content of the atmosphere in the wood drying room 1 low. As a result, in the system, the oxygen content of the atmosphere in the wood drying room 1 is prevented from varying, and the room 1 is also uniform or stabilized in temperature distribution.

As described above, in drying operation performed in the system of the present invention, the wood drying room 1 is filled with the hot combustion gas which is low in oxygen content and stabilized in temperature distribution. Consequently, it is possible to effectively dry the green wood in the wood drying room 1 of the system. The bulk of volatile gases produced from the green wood in the wood drying room 1 during drying operation is so circulated as to be supplied to the combustion chamber 21 of the combustion-gas generator 2, in which chamber 21 these volatile gases are burned together with the fuel such as waste wood to produce a combustion gas. Consequently, it is possible for the wood drying system of the present invention to prevent the atmosphere from being contaminated by such volatile gases.

Incidentally, in the above embodiment of the system of the present invention, the exhaust-gas discharging conduit 6 is directly connected with the bottom corner portion of the or wood drying room 1. However, it is also possible for the system of the present invention to permit a part of the exhaust-gas discharging conduit 6 to form the combustion-gas recovery conduits 5.

Further, in the wood drying system of the present invention, it is also possible to form the exhaust-gas discharging conduit 6 as a branched conduit of any one of the combustion-gas recovery conduits 5.

Still further, in the wood drying system-of the present invention, the gas flow-rate control unit is constructed of: the fans 51 and the dampers 52 combined with the fans 51; or the damper 41, 61 only. However, it is also possible to replace such gas flow-rate control unit with a speed-controllable fan capable of being controlled in rotational speed.

In wood drying system of the present invention, since the hot atmosphere in the wood drying room 1 is kept low in oxygen content while being uniform or stabilized in temperature distribution, it is possible to produce the high-quality products or dried woods with good yields.

What is claimed is:

1. An apparatus for drying a quantity of wood which comprises:

a wood drying room which includes a plurality of walls having exterior surfaces, which walls define a generally unobstructed open interior space and a combustion-gas supply passage therebetween which are capable of being sealed;

a combustion-gas generator provided with an air-inlet conduit for introducing fresh air for combustion use into a combustion chamber provided in a lower area of said combustion-gas generator, said combustion-gas supplying passage extending from an upper area of said combustion-gas generator to an opening in said wood drying room which opening is located at an upper portion of said wood drying room at one side thereof;

an exhaust-gas discharging conduit extending to a chimney from a bottom area of said wood drying room, said chimney being located on a side of said wood drying room which is opposite said side at which said opening is located;

a combustion-gas recovery conduit extending from said bottom area of said wood drying room to said combustion-gas generator; and a gas flow-rate control unit provided in at least one of said exhaust-gas discharging [control] *conduit* or said combustion-gas recovery conduit, wherein said generally unobstructed open interior space is rectangular.

2. An apparatus for drying wood, as set forth in claim 1, where:

said combustion-gas recovery conduit is directly connected with said combustion-gas generator.

3. An apparatus for drying wood, as set forth in claim 1, where:

said combustion-gas recovery conduit is connected with said air-inlet conduit.

4. An apparatus for drying wood, as set forth in claim 1, where:

said gas flow-rate control unit comprises a fan and a damper.

5. An apparatus for drying wood, as set forth in claim 1, where:

said gas flow-rate control unit comprises at least one of a fan or a damper.

6. An apparatus for drying wood, as set forth in claim 5, where:

said fan or said damper is provided in said air-inlet conduit.

7. An apparatus for drying wood, as set forth in claim 5, where:

said fan is provided in at least one of said air-inlet conduit, said exhaust-gas discharging conduit, or said combustion-gas recovery conduit.

8. An apparatus for drying wood, as set forth in claim 1, where:

said gas flow-rate control unit comprises a speed-controllable fan.

9. An apparatus for drying a quantity of wood which comprises:

a wood drying room which includes a plurality of walls having exterior surfaces, which walls define a generally unobstructed open interior space and a combustion-gas supply passage therebetween which are capable of being sealed;

a combustion-gas generator provided with an air-inlet conduit for introducing fresh air for combustion use into a combustion chamber provided in a lower area of said combustion-gas generator, said combustion-gas supplying passage extending from an upper area of said combustion-gas generator to an opening in said wood drying room which opening is located at an upper portion of said wood drying room at one side thereof;

an exhaust-gas discharging conduit extending to a chimney from a bottom area of said wood drying room, said chimney being located on a side of said wood drying room which is opposite said side at which said opening is located;

a combustion-gas recovery conduit extending from said bottom area of said wood drying room to said combustion-gas generator; and a gas flow-rate control unit provided in at least one of said exhaust-gas discharging control or said combustion-gas recovery conduit, wherein said combustion-gas recovery conduit comprises a manifold having conduits extending from a plurality of positions in said bottom area of said wood drying room and wherein said gas flow-rate control unit is provided in each of the conduits and selectively operable to open or close each respective conduit.

10. An apparatus for drying wood as set forth in claim 9, wherein said manifold conduits are provided through a bottom surface of said wood drying room.

*11. A method of drying wood which comprises:*

*piling green wood in a drying room;*

*closing and hermetically sealing the drying room;*

*producing a hot combustion gas in a combustion chamber;*

*introducing said hot combustion gas from the combustion chamber into the closed and hermetically sealed drying room so as to gradually replace air previously confined in the drying room, until the drying room is filled with said hot combustion gas; and*

*controlling a combustion rate in the combustion chamber after the drying room is filled with said hot combustion gas by controlling an amount of fresh air introduced into the combustion chamber and by allowing an equivalent amount of said hot combustion gas to escape out of the drying room and by forcibly circulating a portion of said hot combustion gas so as to keep the oxygen concentration in the drying room at a constant level and to stabilize temperature distribution in the drying room.*

*12. A method for drying wood according to claim 11, wherein said hot combustion gas is produced by burning wood in the combustion chamber.*

* * * * *